UNITED STATES PATENT OFFICE.

GEORGE G. PORTER, OF SYRACUSE, NEW YORK.

DEVICE FOR GOVERNING THE FLOW OF FLUIDS.

No. 829,669.   Specification of Letters Patent.   Patented Aug. 28, 1906.

Application filed May 29, 1905. Serial No. 262,775.

*To all whom it may concern:*

Be it known that I, GEORGE G. PORTER, of Syracuse, in the county of Onondaga and State of New York, have invented a certain new and useful Device for Governing the Flow of Fluids, of which the following is a specification.

My invention has for its object the production of a device for governing the flow of fluids, which is particularly simple in construction and highly efficient and practical in use; and to this end it consists in the novel combinations and constructions hereinafter set forth and claimed.

In describing this invention reference is had to the accompanying drawings, in which like characters designate corresponding parts in all the views.

Figure 1:
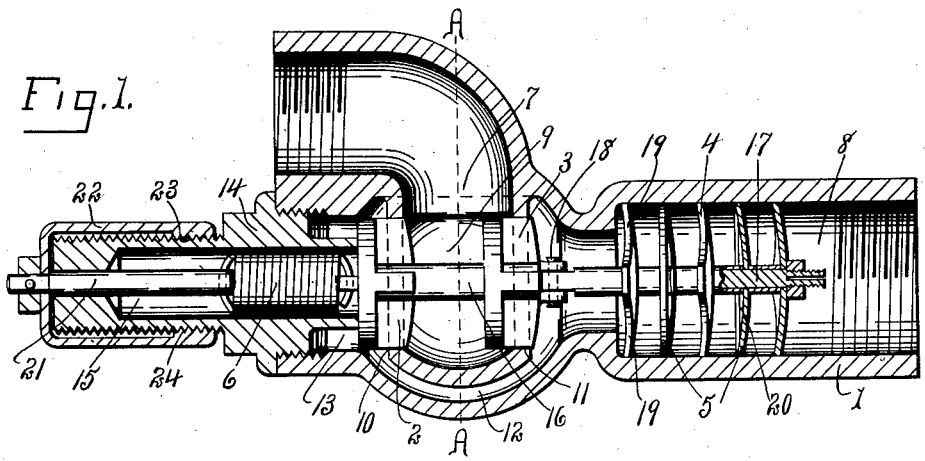
Figure 2:
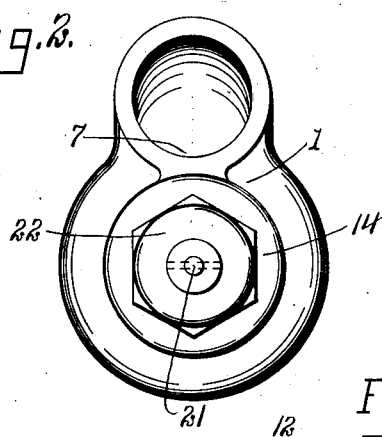
Figure 3:
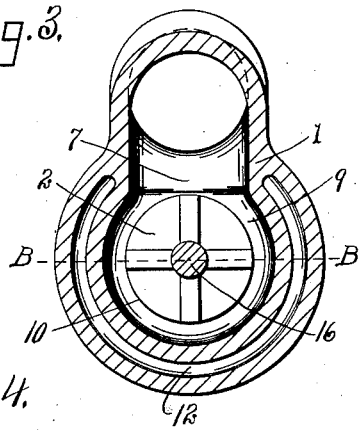
Figure 4:
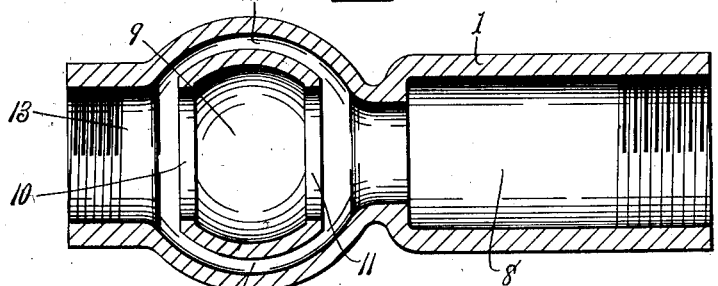
Figures 5, 6:
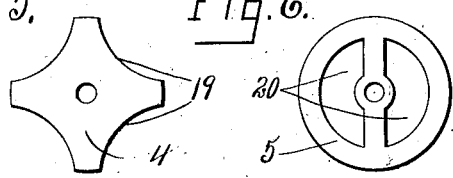

Figure 1 is a longitudinal sectional view, partly in elevation, of my governing device. Fig. 2 is an end view thereof. Fig. 3 is a sectional view on line A A, Fig. 1. Fig. 4 is a longitudinal sectional view of the casing on line B B, Fig. 3. Figs. 5 and 6 are detail views of the pressure-operated members.

This governing device comprises a casing 1, valves 2 3 in the casing, pressure-operated members 4 5, connected to the valves for moving the same in one direction, and means, as a spring 6, for moving the valves in the opposite direction.

The casing 1 is of any desirable form, size, and construction, is formed with inlet and outlet conduits 7 8, disposed at an angle to each other, and with a valve-chamber 9, arranged at the angle of the conduits, said chamber 9 being formed with openings 10 11, located at opposite sides thereof and alined with the outlet-conduit 8, the opening 11 nearest the outlet-conduit communicating directly with said conduit and the other opening 10 communicating with the outlet-conduit 8 through an annular branch passage 12, partially encircling the valve-chamber. The inlet-conduit 7 communicates with the valve-chamber 9 between the openings 10 11, so that the fluid in passing through the chamber 9 is distributed equally through the openings 10 11. The side of the casing 1 opposed to the outlet-conduit 8 is formed with a socket 13, alined with the openings 10 11 and receiving a plug 14, which is provided with an internal chamber 15, opening through its inner end. The inner end of the plug 14 serves as a shoulder to limit the movement of the valves from their closed position.

The valves 2 3 are of any desirable form, size, and construction and are here shown as reciprocating and as controlling the flow of the fluid through the openings 10 11, respectively. These valves are connected together, as by a stem 16, rigid therewith, so that the movement of one is transmitted to the other, and thus the pressure exerted by the fluid on one valve is neutralized by the pressure on the other.

Usually the pressure-operated members 4 5 consist of disks loosely fitting in the outlet-conduit 8 and arranged one in advance of the other. Said members 4 5 alternate with each other and are connected to the valves 2 3 by suitable means, as a rod 17, fixed thereto and hinged at one end at 18 to the adjacent valve, so that the members 4 5 are free to move laterally slightly in the outlet-conduit relatively to the valves 2 3 without causing said valves to bind against their circular seats. As seen in Figs. 1, 5, and 6, the members 4 5 are formed with staggered passages therethrough, consisting of peripheral cut-outs 19 in the members 4 and openings 20 about the centers of the members 5.

The spring 6 is disposed in the chamber 15, formed in the plug 14, and is alined with the valves 2 3, one end thereof being pivotally connected to the adjacent valve 2 and its other end being connected to a stem 21, which is extended through the outer end of the plug 14 and connected to a hand-engaging shell 22, encircling the outer end of the plug 14. The tension of this spring may be adjusted by turning the hand-engaging shell 22 on the plug 14, said shell having internal threads 23, which mesh with external threads 24 on the plug.

In operation the fluid passes from the inlet-conduit 7 to the valve-chamber 9 and divides, one current passing directly through the opening 11 to the outlet-conduit 8 and the other current passing through the opening 10 and the branch conduit 12 to the exit-conduit 8. The united currents then act upon the members 4 5 in the outlet-conduit, thus tending to close the valves 2 3 against the action of the spring 6. When the pressure rises above a predetermined point, the valves will be moved toward their closed position by the fluid acting upon the members or disks 4 5, and when the pressure is diminished the spring will again open the valves. The amount of pressure necessary to operate the valves can be regulated by turning the handpiece 22.

The construction and operation of my governing device will now be readily understood upon reference to the foregoing description and the accompanying drawings, and it will be noted by those skilled in the art that more or less change may be made in the component parts thereof without departing from the spirit of my invention.

Having thus fully described my invention, what I claim as new, and desire to secure by Letters Patent, is—

1. In a device for governing the flow of fluids, a casing having inlet and outlet conduits, a valve disposed in the casing, a plurality of pressure-operated members arranged one in advance of the other in one of said conduits and connected to the valve for moving the same in one direction, said members having staggered passages therethrough, and means connected to said valve for moving the same in the opposite direction, substantially as and for the purpose set forth.

2. In a device for governing the flow of fluids, a casing formed with a valve-chamber having openings at opposite sides thereof, an inlet-conduit communicating with the chamber, and an outlet-conduit alined with said openings, valves for controlling the flow of the fluid through the openings, respectively, a stem connecting the valves, said stem being rigid with the valves, a pressure-operated member arranged in the outlet-conduit, means connecting the pressure-operated member and the adjacent valve whereby said member moves the valves in one direction, said means including a hinge for permitting the pressure-operated member to move laterally in the conduit relatively to the valves, and means for moving the valves in the opposite direction, substantially as and for the purpose set forth.

3. In a device for governing the flow of fluids, a casing formed with a valve-chamber having openings at opposite sides thereof, an inlet-conduit communicating with the chamber, and an outlet-conduit alined with said openings, valves for controlling the flow of the fluid through the openings, respectively, a stem connecting the valves, said stem being rigid with the valves, a plurality of pressure-operated members arranged one in advance of the other in the outlet-conduit and consisting of disks loosely fitting the outlet-conduit and formed with staggered passages therein and a rod connecting the pressure-operated members and the adjacent valve whereby said members move the valves in one direction, said rod being hinged to the adjacent valve for permitting the pressure-operated members to move laterally in the conduit without disturbing the alinement of the valves, and a spring pivotally connected to the valves for moving the same in the other direction, substantially as and for the purpose specified.

4. In a device for governing the flow of fluids, a casing having inlet and outlet conduits, and a socket extending through the inner and outer faces of the casing, a valve in the casing movable in one direction by the pressure of the fluid, a plug disposed in said socket and provided with an internal chamber opening through the inner end thereof, and a spring located in said chamber and connected to the valve for moving the same in the opposite direction, substantially as and for the purpose set forth.

5. In a device for governing the flow of fluids, a casing having inlet and outlet conduits, and a socket extending through the inner and outer faces of the casing, a valve in the casing, a pressure-operated member arranged in one of the conduits and connected to the valve for moving the same in one direction, a plug disposed in said socket and provided with an internal chamber opening through the inner end thereof, and a spring located in said chamber and connected to the valve for moving the same in the opposite direction, substantially as and for the purpose described.

6. In a device for governing the flow of fluids, a casing having inlet and outlet conduits, and a socket extending through the inner and outer faces of the casing, a valve in the casing movable in one direction by the pressure of the fluid, a plug disposed in said socket and provided with an internal chamber opening through the inner end thereof, said plug being formed with external threads, a spring located in said chamber and connected to the valve for moving the same in the opposite direction, and a shell inclosing the end of said plug and provided with internal threads meshing with the external threads on the plug, substantially as and for the purpose specified.

In testimony whereof I have hereunto signed my name, in the presence of two attesting witnesses, at Syracuse, in the county of Onondaga, in the State of New York, this 24th day of May, 1905.

GEORGE G. PORTER.

Witnesses:
F. G. BODELL,
T. DAVIS.